(12) United States Patent
Wendt et al.

(10) Patent No.: US 10,387,559 B1
(45) Date of Patent: Aug. 20, 2019

(54) TEMPLATE-BASED IDENTIFICATION OF USER INTEREST

(71) Applicant: Google Inc., Mountain View, CA (US)

(72) Inventors: James Wendt, Los Angeles, CA (US); Jie Yang, Sunnyvale, CA (US); Ying Sheng, Sunnyvale, CA (US); Jing Xie, San Jose, CA (US); Luis Garcia Pueyo, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/359,101

(22) Filed: Nov. 22, 2016

(51) Int. Cl.
*G06F 16/35* (2019.01)
*G06F 17/24* (2006.01)
*G06F 16/9535* (2019.01)
*G06F 17/27* (2006.01)
*G06F 16/93* (2019.01)

(52) U.S. Cl.
CPC ............ *G06F 17/248* (2013.01); *G06F 16/35* (2019.01); *G06F 16/93* (2019.01); *G06F 16/9535* (2019.01); *G06F 17/2775* (2013.01)

(58) Field of Classification Search
CPC .......................... G06F 17/248; G06F 17/30705
See application file for complete search history.

(56) References Cited

U.S. PATENT DOCUMENTS

| | | | |
|---|---|---|---|
| 5,761,662 A * | 6/1998 | Dasan ...................... | G06F 16/10 |
| 7,139,974 B1 * | 11/2006 | Bascom ................ | G06F 16/288 715/236 |
| 7,158,971 B1 * | 1/2007 | Bascom .............. | G06F 17/2247 |
| 7,505,984 B1 * | 3/2009 | Nevill-Manning .......................... | G06F 17/2211 |
| 7,716,217 B2 * | 5/2010 | Marston ............... | G06Q 10/107 707/728 |
| 7,836,012 B1 * | 11/2010 | Nevill-Manning ......................... | G06F 17/2211 707/602 |
| 7,873,555 B1 * | 1/2011 | Kraemer ................. | G06Q 40/00 705/35 |
| 8,082,248 B2 * | 12/2011 | Abouyounes ........... | G06F 16/58 707/731 |
| 8,095,582 B2 * | 1/2012 | Cramer .............. | G06Q 30/0244 707/723 |

(Continued)

*Primary Examiner* — Scott T Baderman
*Assistant Examiner* — Benjamin Smith
(74) *Attorney, Agent, or Firm* — Middleton Reutlinger

(57) ABSTRACT

Methods and apparatus are described herein for creating associations between user interests and electronic document templates generated from B2C electronic documents. Once these associations are created, interest(s) of a user (e.g., a user profile) may be determined automatically based on B2C electronic documents addressed to the user. In various implementations, an electronic document addressed to a user may be identified. A particular electronic document template that corresponds to the electronic document addressed to the user may be selected from a plurality of electronic document templates. The selecting may be based on attribute(s) shared between the electronic document addressed to the user and the selected electronic document template. The particular electronic template may be generated from a plurality of electronic documents that share fixed content. Interest(s) associated with the particular electronic document template may be identified, and association(s) between the user and the identified interest(s) may be stored.

16 Claims, 6 Drawing Sheets

(56) References Cited

U.S. PATENT DOCUMENTS

| Patent/Pub. No. | Date | Inventor | Classification |
|---|---|---|---|
| 8,117,197 B1* | 2/2012 | Cramer | G06Q 30/0256 707/731 |
| 8,239,387 B2* | 8/2012 | Madaan | G06F 16/355 707/737 |
| 8,364,467 B1* | 1/2013 | Bowman | G06F 16/35 704/9 |
| 8,386,487 B1* | 2/2013 | Ben-Artzi | G06F 16/35 707/737 |
| 8,458,584 B1* | 6/2013 | Wilson | G06F 16/951 715/234 |
| 8,538,959 B2* | 9/2013 | Jin | G06F 16/9535 707/732 |
| 8,561,185 B1* | 10/2013 | Muthusrinivasan | G06F 21/6245 705/51 |
| 8,583,648 B1* | 11/2013 | Majkowska | G06F 16/35 707/737 |
| 8,589,366 B1* | 11/2013 | Younes | G06F 17/2247 707/705 |
| 8,630,989 B2* | 1/2014 | Blohm | G06F 17/278 707/705 |
| 8,862,519 B2* | 10/2014 | O'Sullivan | G06Q 10/10 706/11 |
| 9,367,823 B1* | 6/2016 | Mihalik | G06F 16/9535 |
| 9,563,689 B1* | 2/2017 | Pueyo | G06F 17/30705 |
| 9,652,530 B1* | 5/2017 | Bendersky | G06F 16/83 |
| 9,785,705 B1* | 10/2017 | Cartright | G06F 17/30705 |
| 10,127,525 B2* | 11/2018 | Childress | G06Q 10/107 |
| 10,230,805 B2* | 3/2019 | Bostick | H04L 67/22 |
| 2004/0205127 A1* | 10/2004 | Ben-Yoseph | H04L 51/043 709/204 |
| 2005/0076003 A1* | 4/2005 | DuBose | G06F 16/9535 |
| 2007/0073816 A1* | 3/2007 | Kumar | G06Q 10/107 709/206 |
| 2007/0179945 A1* | 8/2007 | Marston | G06Q 10/107 |
| 2007/0203906 A1* | 8/2007 | Cone | G06F 16/951 |
| 2007/0233777 A1* | 10/2007 | Bates | G06F 16/951 709/202 |
| 2007/0260597 A1* | 11/2007 | Cramer | G06Q 30/0244 |
| 2008/0046441 A1* | 2/2008 | Wen | G06F 17/2241 |
| 2008/0313040 A1* | 12/2008 | Rose | G06Q 30/02 705/14.69 |
| 2009/0089151 A1* | 4/2009 | Protheroe | G06Q 10/00 705/14.69 |
| 2009/0291665 A1* | 11/2009 | Gaskarth | G06Q 30/04 455/405 |
| 2010/0030865 A1* | 2/2010 | Jiang | G06Q 10/107 709/207 |
| 2010/0076847 A1* | 3/2010 | Heller | G06Q 30/02 705/14.53 |
| 2010/0100815 A1* | 4/2010 | Hutchinson | G06F 17/2229 715/256 |
| 2010/0106703 A1* | 4/2010 | Cramer | G06Q 30/0244 707/706 |
| 2010/0169264 A1* | 7/2010 | O'Sullivan | G06Q 10/10 706/52 |
| 2010/0169792 A1* | 7/2010 | Ascar | G06F 11/3414 715/744 |
| 2010/0179961 A1* | 7/2010 | Berry | G06Q 10/107 707/769 |
| 2010/0235367 A1* | 9/2010 | Chitiveli | G06F 16/353 707/752 |
| 2010/0251128 A1* | 9/2010 | Cordasco | G06F 11/328 715/736 |
| 2010/0325115 A1* | 12/2010 | Xu | G06F 17/245 707/749 |
| 2011/0219081 A1* | 9/2011 | Parthasarathy | H04L 51/12 709/206 |
| 2012/0005284 A1* | 1/2012 | Tse | G06Q 10/10 709/206 |
| 2012/0016875 A1* | 1/2012 | Jin | G06F 16/9535 707/734 |
| 2012/0022949 A1* | 1/2012 | George | G06Q 10/103 705/14.66 |
| 2012/0117058 A1* | 5/2012 | Rubinstein | G06F 16/951 707/723 |
| 2012/0143734 A1* | 6/2012 | Pekerman | H04L 12/14 705/32 |
| 2012/0215853 A1* | 8/2012 | Sundaram | H04L 63/126 709/206 |
| 2012/0254388 A1* | 10/2012 | Duxbury | H04L 43/026 709/223 |
| 2012/0290356 A1* | 11/2012 | Yu | G06Q 30/02 705/7.29 |
| 2012/0297025 A1* | 11/2012 | Zeng | G06F 17/30864 709/217 |
| 2012/0317499 A1* | 12/2012 | Shen | H04L 51/04 715/752 |
| 2013/0004930 A1* | 1/2013 | Sorenson | G09B 7/02 434/350 |
| 2013/0031470 A1* | 1/2013 | Daly, Jr. | G06F 17/30867 715/243 |
| 2013/0117012 A1* | 5/2013 | Orlin | G06Q 10/00 704/9 |
| 2013/0138655 A1* | 5/2013 | Yan | G06F 16/337 707/738 |
| 2013/0232515 A1* | 9/2013 | Rivera | H04N 21/44213 725/12 |
| 2013/0239016 A1* | 9/2013 | Adams | G06Q 10/107 715/752 |
| 2013/0311875 A1* | 11/2013 | Pappas | G06F 17/2247 715/234 |
| 2014/0006139 A1* | 1/2014 | Aggarwal | G06Q 30/0242 705/14.41 |
| 2014/0032311 A1* | 1/2014 | Cramer | G06Q 30/0256 705/14.45 |
| 2014/0279793 A1* | 9/2014 | Wohlstadter | G06Q 30/0269 706/46 |
| 2014/0280554 A1* | 9/2014 | Webb | H04L 67/22 709/204 |
| 2015/0058429 A1* | 2/2015 | Liu | H04L 51/34 709/206 |
| 2015/0073895 A1* | 3/2015 | Karnin | G06Q 30/0251 705/14.49 |
| 2015/0310115 A1* | 10/2015 | Ryger | G06F 16/93 707/708 |
| 2016/0055487 A1* | 2/2016 | Votaw | G06Q 20/4014 705/44 |
| 2016/0119268 A1* | 4/2016 | Sharp | H04L 51/12 709/206 |
| 2016/0125085 A1* | 5/2016 | Vasudevan | G06F 16/9535 707/734 |
| 2016/0253616 A1* | 9/2016 | Mihalik | G06F 16/9535 705/7.14 |
| 2016/0335243 A1* | 11/2016 | Zhai | G06F 17/248 |
| 2016/0379127 A1* | 12/2016 | Childress | G06Q 10/107 706/11 |
| 2017/0034674 A1* | 2/2017 | Radhakrishnan | H04W 4/90 |
| 2017/0140415 A1* | 5/2017 | Jamison | G06Q 10/107 |
| 2018/0006989 A1* | 1/2018 | Dotan-Cohen | H04L 51/04 |
| 2018/0007099 A1* | 1/2018 | Ein-Gil | H04L 63/08 |
| 2018/0067910 A1* | 3/2018 | Alonso | G06F 17/2211 |

\* cited by examiner

TEMPLATE-BASED IDENTIFICATION OF USER INTEREST

BACKGROUND

Users may be sent a variety of so-called "business-to-consumer" ("B2C") electronic documents (e.g., electronic correspondence such as emails) from a variety of entities, such as businesses, clubs, sports teams, news outlets, etc. Unlike personal electronic documents (e.g., so-called "consumer-to-consumer" or "C2C" emails), B2C electronic documents may be generated from templates, and therefore it is possible to reverse engineer templates for a plurality of electronic documents that share fixed content and/or other attributes. Additionally, users sometimes elect to receive B2C electronic documents from particular entities, e.g., by signing up for a newsletter or newsfeed, or by agreeing to receive correspondence from the entity as part of another transaction. Thus, the entities from which a user receives B2C correspondence may be indicative of one or more interests of the user under some circumstances.

SUMMARY

The present disclosure is generally directed to methods, apparatus and computer-readable media (transitory and non-transitory) for creating (e.g., storing in a database) associations between user interests and electronic document templates generated from B2C electronic documents (e.g., emails). Once these associations are created, one or more interests of a user (e.g., a user profile) may be determined automatically based on B2C electronic documents addressed to the user. In particular, when the user receives (or in some implementations, opens and/or labels) a B2C electronic document from a particular entity, the document may be matched to an electronic document template generated from similar electronic documents sent by the same entity. Then, one or more interests associated with the electronic document template may be ascribed (e.g., stored in memory as part of a user profile) to the user. As used herein, an "interest" of a user may refer to people (e.g., public figures, celebrities, athletes, actors, other individuals), places (e.g., vacation destinations, resorts, restaurants, bars, venues, etc.), companies, organizations (e.g., sports teams, music groups, etc.), services (e.g., banks, ride sharing, streaming services), events, topics (e.g., movies, literature, sports, television shows), known "entities" (which as described below may include people, places, things, etc.) and so forth, for which the user has affinities for or is otherwise compelled to seek out information about.

Associations between electronic document templates and interests may be created in various ways. In a simple implementation, a most common sender domain (e.g., a sender address) associated with electronic documents underlying an electronic document template may be associated with an entity (e.g., a sports team). This entity may then be associated with the electronic document template, e.g., as an interest.

In other implementations, after a sender address associated with electronic documents underlying an electronic document template is used to identify an entity, the identified entity (or in some cases, simply the domain) may be used to retrieve one or more web documents (e.g., web pages) associated with the entity. For example, all or at least some web pages associated with the sender's domain may be retrieved. Various tools, such as an entity and/or topic classifier, may be used on the plurality of web documents to, for instance, identify the most frequently mentioned entities (or topics). One or more mentioned entities (or topics) that satisfy a threshold may be identified as interests associated with the electronic document template.

In yet other implementations, an entity may once again be identified from a sender address associated with an electronic document template. However, the entity may then be submitted to a search engine as a search query. Web documents associated with one or more top-ranking search results may be analyzed (e.g., using the aforementioned entity/topic classifier) to identify the most frequently mentioned entities and/or topics. Again, one or more mentioned entities and/or topics that satisfy a threshold may be identified as interests associated with the electronic document template.

In yet other implementations, rather than using a sender address, the topic/entity classifier may be used to analyze a plurality of electronic documents underlying (e.g., used to generate) the electronic document template. The most mentioned entities/topics may once again be considered as potential interests to associate with the electronic document template. Such implementations may be particularly applicable in instances in which the B2C electronic documents are sent from a relatively generic entity (e.g., a sports news outlet) that could potentially be associated with an inordinate number of other entities (e.g., sports teams, players, coaches, stadiums, etc.). For example, suppose 20% of B2C emails underlying a template mention player A, 23% of the B2C emails mention player B, and 60% of the B2C emails mention a team of which players A and B are members. Even if the team was mentioned least frequently within individual emails, because the team was most frequently mentioned across all the emails underlying the template, the team may be identified as the most likely interest associated with the template. Of course, in some implementations, more than one interest may be associated with an electronic document template, e.g., where two or more entities are mentioned at similar frequencies across all emails underlying a template.

Once associations between interests (and/or topics) and electronic document templates are established, those associated interests may be ascribed to users. For example, when a user receives a B2C email, that email may be matched to a template in a library of templates stored in a database (e.g., based on shared content such as metadata). Then, an association between the interest that is associated with the template (as described above) and the user may be stored, e.g., in a database of user profiles.

Users may receive a large number of unsolicited B2C electronic documents (e.g., SPAM) that may not necessarily be indicative of the users' interests. Accordingly, in various implementations, techniques described herein may not be triggered simply by the fact that a B2C electronic document was sent to the user. For example, in some implementations, if a B2C correspondence is directed to a user's junk folder or a quarantine, that B2C correspondence may not be used to attempt to determine an interest of the user. Similarly, in some implementations, an email may not be considered to ascertain a user's interests unless the user engages it in some way, such as opening it, opening for at least a predetermined time interval, labeling the email (e.g., storing it in a folder), and so forth.

In some implementations, a computer implemented method may be provided that includes: identifying an electronic document addressed to a user; selecting, from a plurality of electronic document templates stored in one or more databases, a particular electronic document template that corresponds to the electronic document addressed to the user, wherein the selecting is based on one or more attributes shared between the electronic document addressed to the user and the selected electronic document template, and the particular electronic template is generated from a plurality of electronic documents that share fixed content; identifying one or more interests associated with the particular electronic document template; and storing, in one or more of the databases, one or more associations between the user and the identified one or more interests.

In various implementations, the method may further include detecting engagement by the user with the electronic document, wherein at least the storing is performed in response to a determination that the detected engagement satisfies a criterion. In various implementations, the detecting engagement may include determining that the user opened the electronic document. In various implementations, the detecting engagement may include determining that the user labeled the electronic document. In various implementations, the detecting engagement may include determining that at least a predetermined time interval elapsed between the user opening and closing the electronic document.

In various implementations, the one or more interests may be identified based on annotations of the particular electronic document template. In various implementations, the method may further include associating the one or more interests with the particular electronic document template based on a sender address associated with the particular electronic document template. In various implementations, the one or more interests may include one or more entities mentioned in one or more web documents sharing a domain with the sender address.

In various implementations, the method may further include associating the one or more interests with the particular electronic document template based on one or more entities mentioned in a plurality of electronic documents used to generate the particular electronic document template.

In another aspect, a computer-implemented method may include: providing an electronic correspondence template that is generated from a plurality of electronic correspondences that share fixed content; determining, based on one or more aggregate attributes of a corpus of electronic documents associated with the electronic correspondence template, one or more interests associated with the electronic correspondence template; determining that a new electronic correspondence addressed to a user corresponds to the electronic correspondence template; and storing, in one or more databases, one or more associations between the user and the one or more interests associated with the electronic correspondence template.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
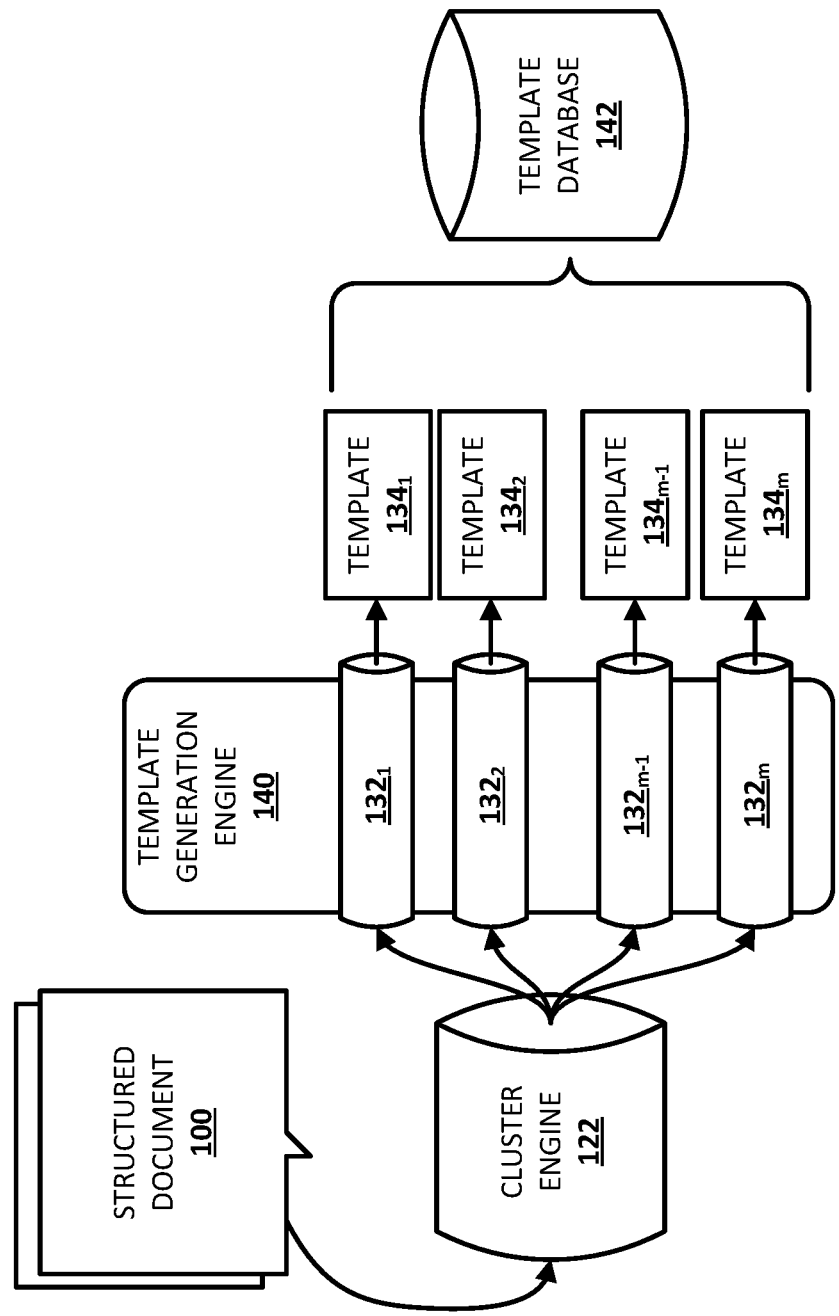
FIG. 1 illustrates an example of how a corpus of structured (e.g., template-generated) electronic documents may be analyzed by various components of the present disclosure to generate one or more electronic document templates.

FIG. 1 illustrates an example environment in which a corpus of structured (e.g., template-generated) electronic documents 100 (e.g., B2C emails) may be grouped into clusters $132_{1-m}$, and in which clusters containing structured documents may be analyzed to generate electronic document templates $134_{1-m}$. As used herein, a "structured document" may refer to B2C communications such as emails, text messages (e.g., SMS, MMS), instant messages, and any other B2C communications, that are typically (but not always) automatically generated, e.g., using a template. In various implementations, structured documents may be structured using various markup languages such as the eXtensible Markup Language ("XML") or the Hypertext Markup Language ("HTML"), though this is not required. In various implementations, a structured document 100 may include various metadata. For instance, emails may include one or more sender identifiers (e.g., sender email addresses), one or more recipient identifiers (e.g., recipient email addresses, including cc'd and bcc'd recipients), a date sent, one or more attachments, a subject, and so forth.

In some implementations, a cluster engine 122 may be configured to group the corpus of structured documents 100 into a plurality of clusters $132_{1-m}$ based on one or more patterns (e.g., fixed content) shared among one or more structured documents 100 within the corpus. In some implementations, cluster engine 122 may have one or more preliminary filtering mechanisms to discard documents that are not suitable for template generation. For example, if a corpus of structured documents 100 under analysis includes personal emails and B2C emails, personal emails may be discarded.

Cluster engine 122 may utilize various aspects of structured documents 100 to group structured documents 100 into clusters. These aspects may include but are not limited to metadata, formatting information (e.g., HTML nodes, XPaths, etc.), textual similarities, byte similarities, formatting similarities (e.g., are particular pieces of information and/or images set apart by particular symbols?), and so forth. For example, in some implementations, B2C emails may be clustered by one or more of the following pieces of metadata: sender address, sender domain, subject (e.g., fixed content within the subject), date, and so forth.

Additionally or alternatively, structured documents 100 may be clustered based on underlying structural similarities. For example, a set of XPaths for an email (e.g., a set of addresses to reach each node in the email's HTML node tree) may be independent of the email's textual content. Thus, the similarity between two or more such emails may be determined based on a number of shared XPaths. An email may be assigned to a particular cluster based on the email sharing a greater number of XPaths with emails of that cluster than with emails of any other cluster. Additionally or alternatively, two email may be clustered together based on the number of XPaths they share compared to, for instance, a total number of XPaths in both emails.

In some implementations, structured documents 100 may additionally or alternatively be grouped into clusters based on textual similarities. For example, emails may be analyzed to determine shared terms, phrases, n-grams, n-grams plus frequencies, and so forth. Based on these data points, emails may be clustered. For example, emails sharing a particular number of shared phrases and n-grams (e.g., fixed content) may be clustered together.

In some implementations, structured documents 100 may be grouped into clusters based on byte similarity. For instance, structured documents 100 may be viewed as strings of bytes that may include one or both of structure (e.g., metadata, XPaths) and textual content. In some implementations, a weighted combination of two or more of the above-described techniques may be used as well. For example, both structural and textual similarity may be considered, with a heavier emphasis on one or the other.

Once corpus of structured documents 100 are grouped into clusters $132_{1-m}$, some clusters may contain structured documents that are highly likely to include the same fixed content (e.g., "boilerplate") and structure, and to have transient data fields (fields that contain data that is not fixed across multiple electronic documents) in the same or similar locations (e.g., spatially and/or in terms of the same XPath). Template generation engine 140 may be configured to generate one or more electronic document templates $134_{1-m}$. Further processing may be performed on electronic document templates $134_{1-m}$ to make them usable by various components to identify interests of users. In various implementations, template generation engine 140 may store templates $134_{1-m}$ in a template database 142.

Figure 2:
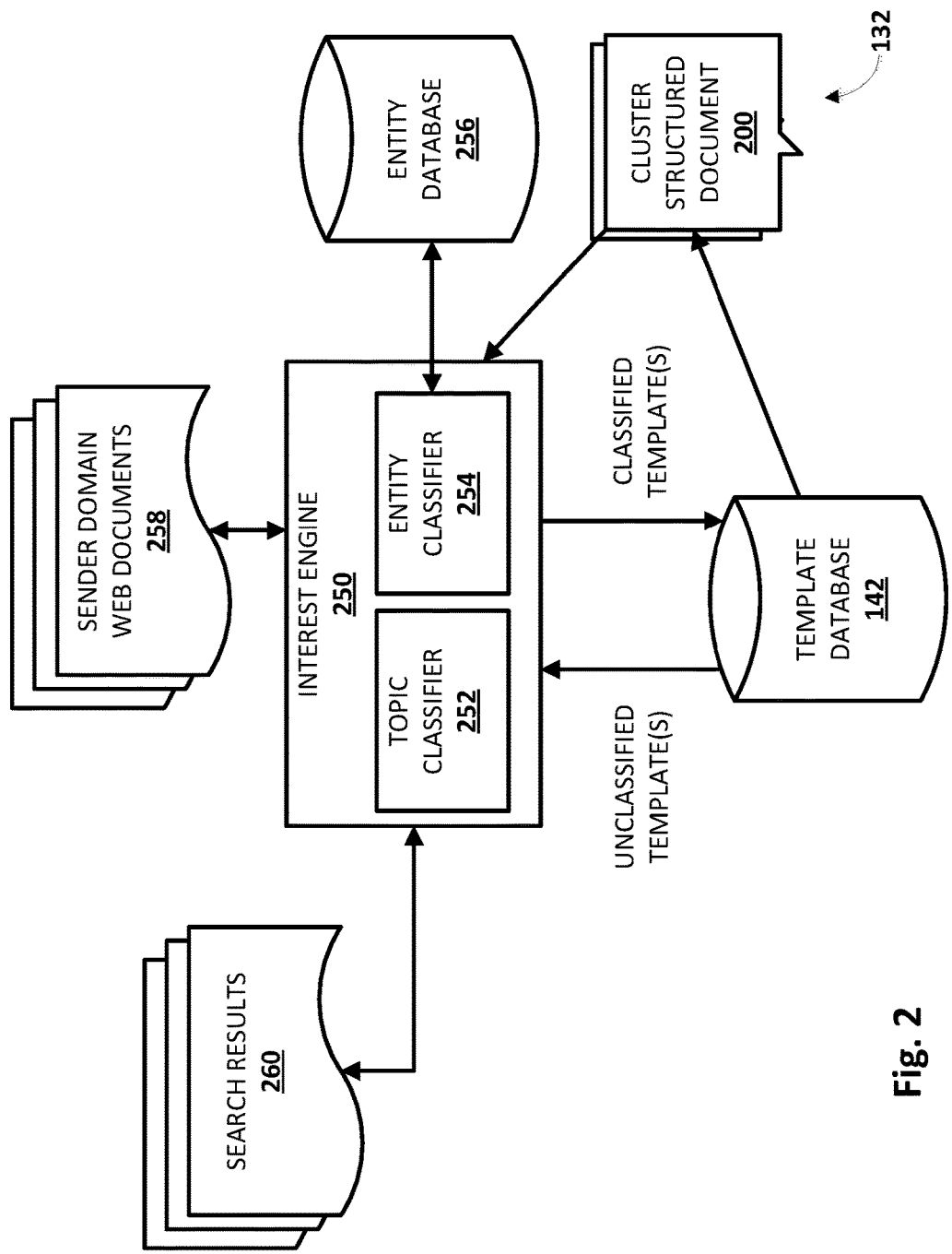
FIG. 2 illustrates an example environment in which disclosed techniques may be practiced, in accordance with various implementations.

FIG. 2 depicts an example environment in which electronic document templates 134 may be linked, annotated, or otherwise associated with user interests. In various implementations, an interest engine 250 may include a topic classifier 252 and/or an entity classifier 254. In some implementations, topic classifier 252 and entity classifier 254 may be combined into a single component.

Topic classifier 252 may be configured to employ various techniques to analyze electronic documents and identify topics that are prevalent in the documents. In some implementations, topic classifier 252 may employ numerical statistics such as keyword counts, term frequency-inverse document frequency ("TF-IDF"), Bayesian methods, and so forth, to identify and/or rank various topics mentioned in a corpus of electronic documents.

Entity classifier 254 may be configured to employ various techniques (e.g., techniques similar to those employed by topic classifier 252) to analyze electronic documents and identify and/or rank entities mentioned in the documents that correspond to known entities stored in entity database 256. As used herein, an "entity" may refer to a person (e.g., a celebrity, public figure, or otherwise), place, or thing that may or may not have various attributes. Entity attributes may be stored in entity database 256 in association with their respective entities.

In some implementations, entities may be stored in entity database 256 as a so-called "knowledge graph." A knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

In some implementations, electronic documents that would otherwise be analyzed by topic classifier 252 and/or entity classifier 254 may be pre-annotated with topics, entities, and/or rankings thereof. For example, a web crawler employed by a search engine may crawl electronic documents, perform topic and/or entity classification of electronic documents, and store annotations of its results in association with the electronic documents, e.g., as part of a knowledge graph, search index, and so forth.

In various implementations, interest engine 250 may be configured to, with or without assistance from topic classifier 252 and/or entity classifier 254, create associations between electronic document templates 134 stored in template database 142 and user interests. For example, in some implementations, interest engine 250 may annotate electronic document templates 134 stored in template database 142 with one or more annotations of one or more user interests associated with each electronic document template 134. User interests to be associated with electronic document templates 134 may be determined in various ways.

In some implementations, a most common sender domain (or more generally, a sender address) associated with electronic documents underlying an electronic document template may be matched to an entity (e.g., in entity database 256). This entity may then be associated with the electronic document template, e.g., as a user interest. Suppose an electronic document template 134 stored in template database 142 is generated using a cluster of structured documents (e.g., B2C emails) sent from a particular sports franchise. Sender addresses used across the cluster of structured documents may in some cases be uniform (i.e., the same sender address for all B2C emails). In other implementations, sender addresses used across the cluster of structured documents may match a particular pattern, such as a regular expression, that is associated with sender addresses employed by the sports franchise. In some implementations, such a sender may be matched to one or more entities in entity database 256.

In some implementations, a list of entities of interest may be pre-established, e.g., from records in entity database 256. A mapping may be created, e.g., by interest engine 250, between each entity in the pre-established list to a list of relevant domains (e.g., DNS domains). A reverse mapping may similarly be established from domains to entities. Each reverse mapping (domain→entity) may then be applied to an electronic document template 134 that, for instance, was generated using emails sent from the respective domain. The mapped entities may be associated with the electronic document template 134.

In other implementations, a sender address associated with a cluster of electronic documents underlying an electronic document template, a domain with which the sender address is associated, and/or an entity associated with the sender address/domain may be used by interest engine 250 to retrieve one or more sender domain web documents 258 (e.g., web pages, other documents available online) associated with the entity. For example, all or at least some web pages associated with (e.g., contained within) the sender's domain (e.g., a DNS domain) may be retrieved. In some implementations, topic classifier 252 and/or entity classifier 254 may analyze the sender domain web documents 258 to, for instance, identify and/or rank the most frequently mentioned topics and/or entities. In various implementations, one or more mentioned topics and/or entities that satisfy a threshold (e.g., a minimum count, minimum frequency among the sender domain web documents 258, etc.) may be identified as interests associated with the electronic document template.

In yet other implementations, a sender address associated with a cluster of electronic documents underlying an electronic document template, a domain with which the sender address is associated, and/or an entity associated with the sender address/domain may be submitted by interest engine 250 to a search engine (not depicted) as a search query. Search results 260 returned by the search engine in response to the search query may be analyzed, e.g., by topic classifier 252 and/or entity classifier 254, to identify the most frequently mentioned topics and/or entities. Similar to above, one or more mentioned entities and/or topics that satisfy a threshold (e.g., count, frequency, etc.) may be identified as interests associated with the electronic document template.

In some implementations, interest engine 250 may only analyze a predetermined number of the search results 260. For example, in some implementations, interest engine 250 may only analyze the top n ranked search results 260. In various implementations, n may be a positive integer that is selected based on various signals, such as a general popularity of the entity being searched, measures of relatedness of lower-ranked search results 260 to top-ranked search results 260, and so forth. For example, if the searched-for entity is very popular (e.g., frequently included in submitted search queries), then search results not directly related to the entity may not be analyzed (or only a small number such results may be analyzed). In some implementations, search results 260 may only be considered if, for instance, they are contained in the same domain as the sender address, or if they comprise a homepage (e.g., index.html) within the same domain as the sender address.

In yet other implementations, rather than using a sender address/domain/entity, interest engine 250 may analyze a cluster 132 of electronic documents 200 underlying (e.g., used to generate) the electronic document template in question. For example, topic classifier 252 and/or entity classifier 254 may determine the most frequently mentioned topics/entities in the cluster 132 of structured documents 200. These topics/entities may be considered as potential interests to associate with the electronic document template 134. Some such implementations may be particularly useful in instances in which the B2C electronic documents are sent from a relatively generic entity (e.g., a sports news outlet) that could potentially be associated with an inordinate number of other entities (e.g., sports teams, players, coaches, stadiums, etc.).

Suppose 20% of a cluster of B2C emails underlying an electronic document template mention player A, 23% of the B2C emails mention player B, and 60% of the B2C emails mention a team of which players A and B are members. Even if the team was mentioned least frequently within individual emails, because the team was most frequently mentioned across all the emails underlying the electronic document template, the team may be identified as the most likely interest associated with the template. Of course, in some implementations, more than one interest may be associated with an electronic document template, e.g., where two or more entities are mentioned at similar frequencies across all emails underlying a template.

In some implementations, topic classifier 252 and entity classifier 254 may work in conjunction with each other to identify user interests from corpuses of documents (e.g., sender domain web documents 258, search results 260, cluster 132). Suppose entity classifier 254 identifies one or more entities mentioned in a corpus of electronic documents, but identified correlations between entities and the corpus of documents are too weak to satisfy one or more thresholds. In various implementations, topics identified by topic classifier 252 after analyzing the same corpus of electronic documents may be used to corroborate the entity correlations. If topic classifier 252 classifies one or more documents of the corpus into an overarching category that also matches one or more of the weakly correlated entities (e.g., "NBA Basketball" matches "Portland Trailblazers"), then the previously weakly correlated entities may be deemed sufficiently correlated to be associated with the electronic document template 134 as user interests.

Figure 3:
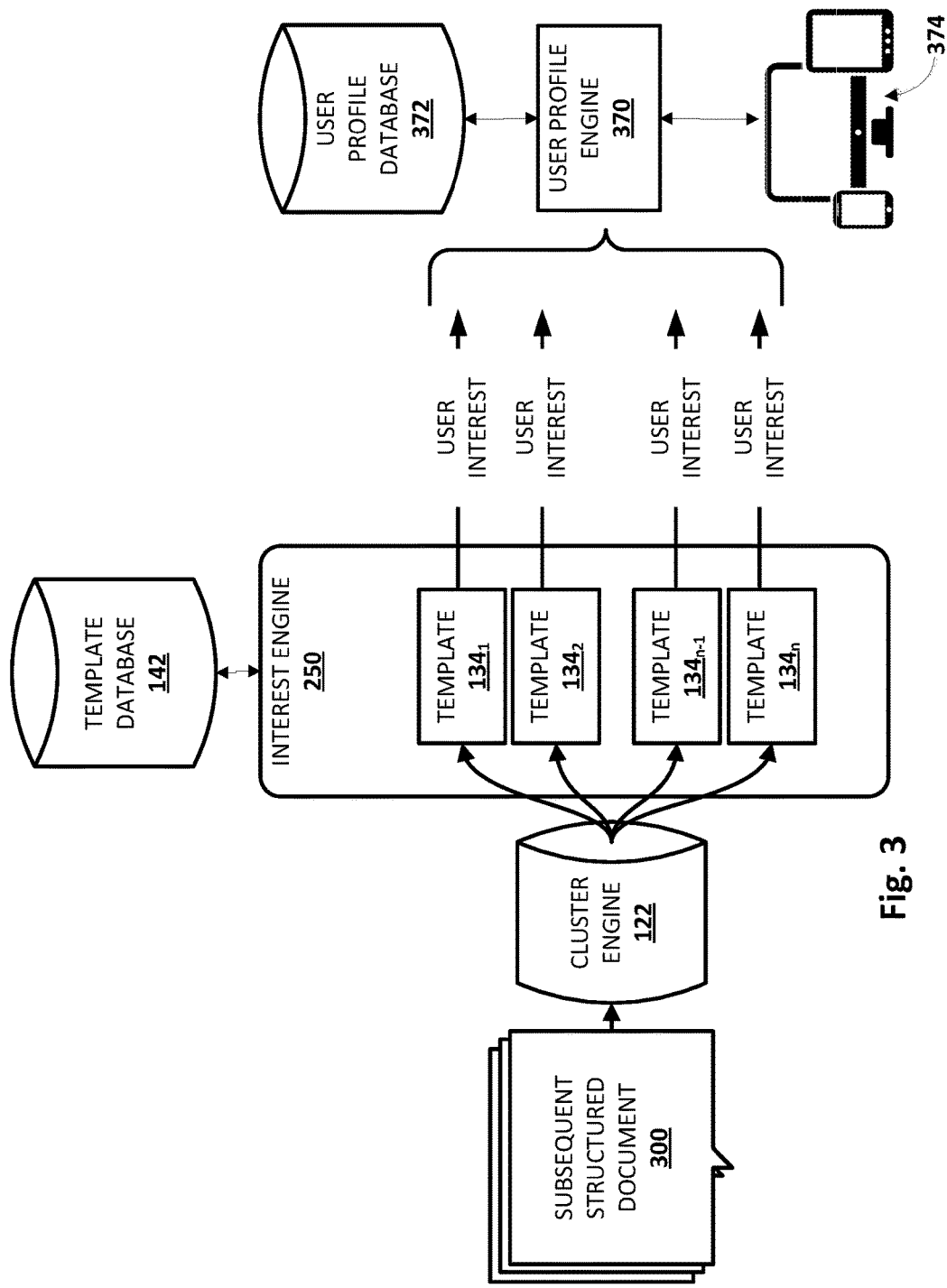
FIG. 3 depicts an example of how user interests may be determined using electronic document templates, in accordance with various implementations.

Once electronic document templates 134 are annotated or otherwise associated with one or more user interests, the electronic document templates 134 may be used to determine user interests based on subsequent structured communications sent to users. Referring now to FIG. 3, subsequent structured documents 300 (e.g., electronic correspondence such as transcribed voicemails, B2C emails, etc.) may be provided to cluster engine 122. Cluster engine 122 may analyze subsequent electronic documents/structured documents 300 to identify which electronic document templates 134 correspond (e.g., match, share fixed content with, etc.) to each subsequent structured document 300, e.g., using similar techniques as were described above with respect to FIG. 1 to organize structured documents 100 into clusters 132.

Interest engine 250 may then analyze electronic document templates 134 corresponding to each cluster to determine interests associated with each electronic document template 134. For example, interest engine 250 may analyze one or more annotations of each electronic document template 134 to identify one or more user interests associated with the electronic document template 134. Interest engine 250 may then provide the identified user interests as output, e.g., to a user profile engine 370.

User profile engine 370 may selectively store, e.g., in a user profile database 372, the user interests in association with user profiles of one or more users to which, for instance, the subsequent structured documents 300 were sent/addressed. These user interests may subsequently be used for various purposes, such as ranking search results provided in response to search queries received from particular users, suggesting alternative queries to particular users, targeting advertising towards particular users, and so forth. In various implementations, user profile engine 370 and/or interest engine 250 may selectively ascribe or not ascribe interests to users based on one or more additional signals. Additionally or alternatively, user profile engine 370 and/or interest engine 250 may ascribe interests to users with varying degrees (or measures) of confidence, depending on a variety of signals.

In some implementations, user profile engine 370 may be configured to detect, e.g., based on user interactions with one or more client devices 374 (e.g., "ecosystems" of client devices operated by users) engagement by users with electronic documents, and may determine whether to ascribe user interests (identified using techniques described herein) to particular users based on a determination of whether the detected engagement satisfies a criterion. Suppose a given user rejects a B2C email from a particular entity, e.g., by blocking the sender, deleting the email without opening it, marking the email as SPAM, etc. Any user interests associated with an electronic document template that matches the B2C email may not necessarily be stored in association with the given user, because the given user has not indicated interest in the B2C email. In some implementations, if a sufficient number of users reject one or more B2C emails that match a particular electronic document template associated with a particular interest, interest engine 250 may remove that interest from the template, or at least decrease a confidence measure associated with the interest.

User engagement of an electronic document may be detected and/or compared to various criteria in various ways. In some implementations, interest engine 250 may determine whether the user opened the electronic document, and/or a time interval between receiving and opening the electronic document. If the user never opens the document, that may indicate that interest(s) associated with a matching electronic template should not be ascribed to the user. Additionally or alternatively, if a relatively long time interval elapses between the user first receiving the electronic document and going back (e.g., scrolling down an inbox) to open the document, that may be a signal that the user is interested in the document (or else the user would not have gone back to open it after so much time elapsed). Similarly, in some implementations, detecting engagement of an electronic document by a user may include determining that at least a predetermined time interval elapsed between the user opening and closing the document. If the user only briefly opened the document, and especially if the user deleted the electronic document immediately thereafter, that may signal a lack of interest by the user in the document. On the other hand, if the user has the electronic document open for a long period of time, and especially if the user scrolls through the entirety of a long electronic document, that may signal interest by the user in the electronic document.

In some implementations, detecting user engagement with an electronic document may include determining that the user labeled the electronic document. For example, if a user moved the electronic document into a particular folder or otherwise flagged the electronic document, that may indicate at least some interest by the user in the electronic document. In other implementations, user engagement with an electronic document may be detected in other ways, such as whether the user forwarded the electronic document (e.g., suggesting the user was interested in the document and/or believed the recipient would be interested), whether the electronic document was forwarded to the user (e.g., indicating that someone else believed the user would be interested in the document), and so forth.

Operations performed by cluster engine 122, template generation engine 140, interest engine 250, topic classifier 252, entity classifier 254, and/or user profile engine 370 may be performed on individual computer systems (including wholly and/or in part on client devices 374), distributed across multiple computer systems, or any combination of the two. These one or more computer systems may be in communication with each other and other computer systems over one or more networks (not depicted). Databases such as template database 142, entity database 256, and/or user profile database 372 may be maintained on one or more computing systems and may include data stored across one or more tables. Data stored in such databases may be stored in any data format, such as lists, graphs, and so forth.

Figure 4:
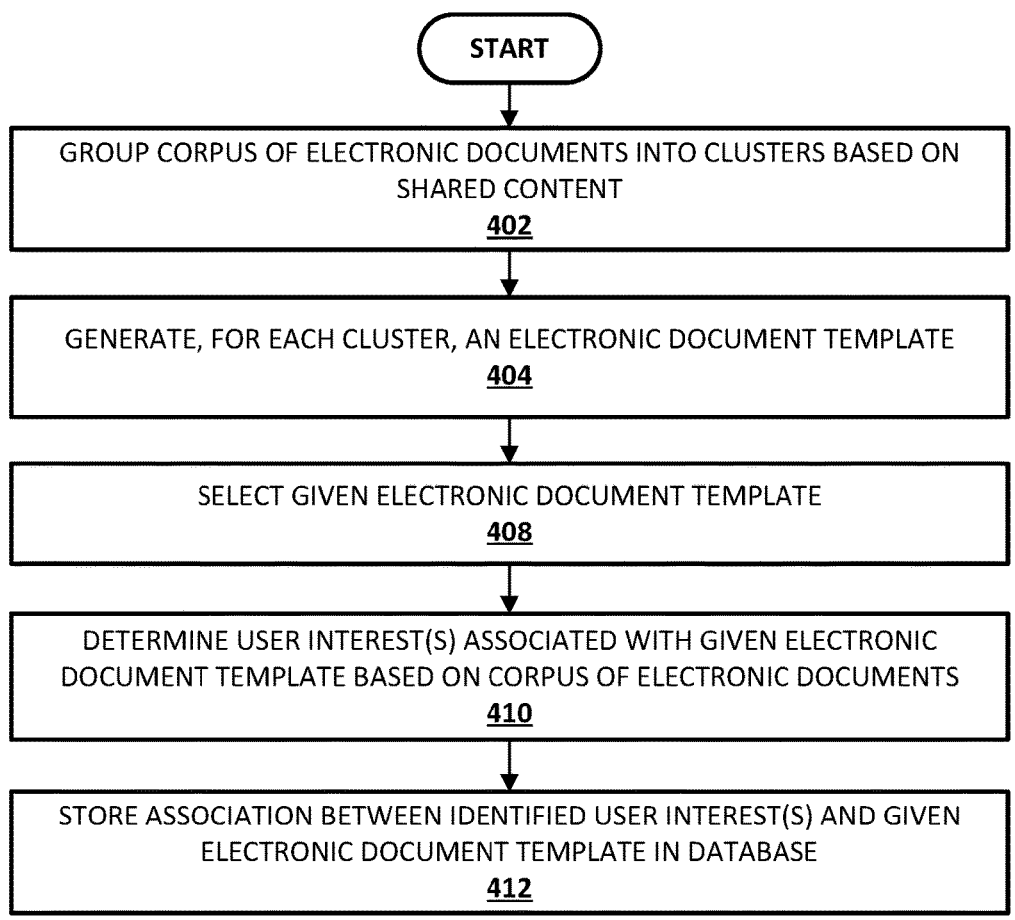
FIG. 4 depicts a flow chart illustrating an example method of generating associations between electronic document templates and user interests, in accordance with various implementations.

Referring now to FIG. 4, an example method 400 is depicted for creating (e.g., storing in a database) associations between user interests and electronic document templates generated from B2C electronic documents (e.g., emails). For convenience, the operations of the flow chart in FIG. 4 are described with reference to a system that performs the operations. This system may include various components of various computer systems. Moreover, while operations of method 400 are shown in a particular order, this is not meant to be limiting. One or more operations may be reordered, omitted or added.

At block 402, the system may group of corpus of electronic documents into clusters based on, for instance, shared content (e.g., fixed content, or "boilerplate", shared formatting, shared metadata, etc.). Techniques for grouping electronic documents into clusters were described above with respect to cluster engine 122. At block 404, the system may generate, for each cluster, an electronic document template, as described above with respect to template generation engine 140. These templates may be stored, for instance, in template database 142.

At block 406, the system may select a given electronic document template, e.g., from template database 142. In some implementations, the system may simply cycle through each electronic document template that is yet unclassified with user interests. At block 410, the system may determine user interests associated with the selected electronic document template based on, for instance, one or more aggregate attributes of a corpus of electronic documents associated with the selected electronic correspondence template. As used herein, "aggregate attributes" of a corpus of electronic documents may include attributes shared among at least a portion of (or all) the corpus of electronic documents, frequencies at which topics and/or entities are mentioned across the electronic documents, and so forth. In some implementations, the corpus of electronic documents may include the plurality of electronic documents that were used to generate the selected electronic document template. In other implementations, the corpus of electronic documents may include web documents (e.g., sender domain web documents 258, search results 260) associated with, for example, a sender of a cluster of electronic documents used to generate the selected electronic document template. Examples of how these various corpuses of documents may be analyzed (e.g., by interest engine 250) to identify user interest(s) to associate with electronic document templates were described above with respect to FIG. 2.

Referring back to FIG. 4, in various implementations, the user interest(s) determined at block 410 may be stored in association with the selected electronic document template in one or more databases, such as template database 142.

Figure 5:
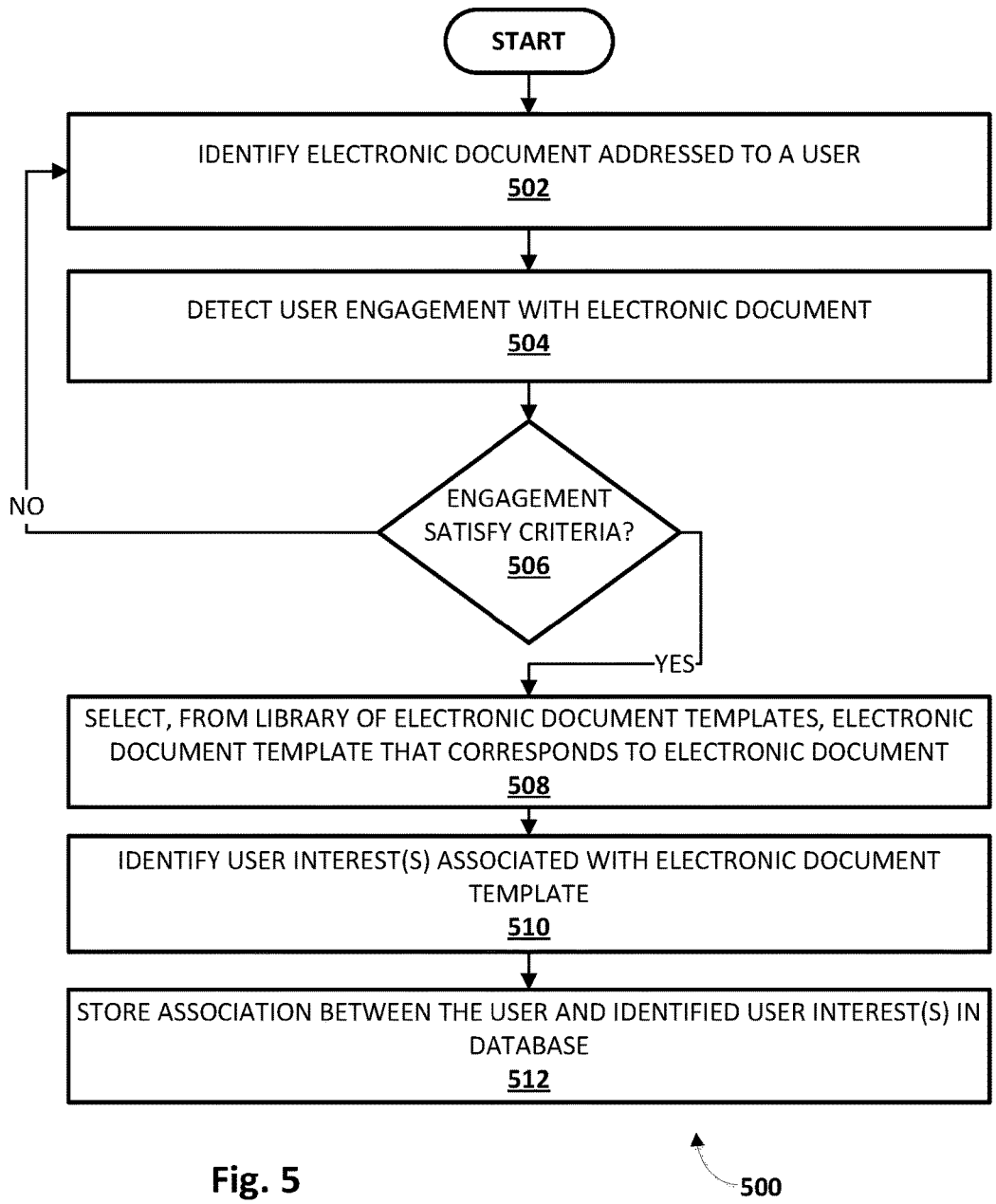
FIG. 5 depicts a flow chart illustrating an example method of applying electronic document templates to electronic documents addressed to users to determine one or more interests of the users, in accordance with various implementations.

Referring now to FIG. 5, an example method 500 is depicted for creating (e.g., storing in a database) associations between users and user interests based on matching electronic document(s) addressed to the user to electronic document templates. For convenience, the operations of the flow chart in FIG. 5 are described with reference to a system that performs the operations. This system may include various components of various computer systems. Moreover, while operations of method 500 are shown in a particular order, this is not meant to be limiting. One or more operations may be reordered, omitted or added.

At block 502, the system may identify an electronic document addressed to a user. In some implementations, the system may identify the electronic document when it is sent to the user, e.g., at some node in between the sender and user and/or at the user's client device. In other implementations, the system may cycle through each electronic document in a user's possession, e.g., emails of a user's inbox.

At block 504, the system may detect a level of user engagement of the identified electronic document addressed to the user. As noted above, user engagement with the electronic document may include but is not limited to the user opening the electronic document, deleting the electronic document (e.g., with or without opening it first), blocking a sender of the document, flagging the electronic document as SPAM, moving the electronic document to a particular location (e.g., a folder), labeling the document (e.g., as pertaining to a particular category, as being particular important, as requiring follow up, etc.), and so forth.

At block 506, the system may determine whether the user engagement detected at block 504 satisfies one or more criteria. For example, the criteria may include whether the user opened the electronic document, whether the user had the electronic document open for at least a threshold time interval (e.g., long enough to fully consume the electronic document, which in some cases may be calculated by the system based on a size of the electronic document), whether the user selected or otherwise operated one or more graphical elements in the electronic document, whether the user forwarded the electronic document, and so forth. In various implementations, one or more criteria such as these may need to be satisfied in order for method 500 to proceed to block 508. If the one or more criteria are not sufficiently satisfied, in various implementations, method 500 may proceed back to block 502 to identify another electronic document.

At block 508, the system may select, e.g., from a library of electronic document templates (e.g., template database 142), an electronic document template that corresponds to the electronic document addressed to the user. In various implementations, the electronic document template may share various content (e.g., boilerplate, metadata, etc.) with the electronic document sent to the user. In some implementations, the electronic document addressed to the user may be matched to the electronic document template based on a combination of various metadata, such as sender address and subject. Other techniques described previously with regard to cluster engine 122 may also be employed.

At block 510, the system may identify one or more user interests associated with the electronic document template. For example, as noted above, the electronic document template may be annotated with one or more user interests. Additionally or alternatively, in some implementations, one or more associations between the electronic document template and one or more user interests may be stored in, for instance, template database 142; the system may read such associations from the database. At block 512, the system may store, e.g., in a database such as user profile database 372, an association between the user and the one or more user interests identified at block 510. Subsequently, the user's profile, and in particular the user interest(s) associated therewith, may be used for various purposes, such as targeted advertising, ranking search results returned to the user, suggesting alternative query suggestions, and so forth.

Figure 6:
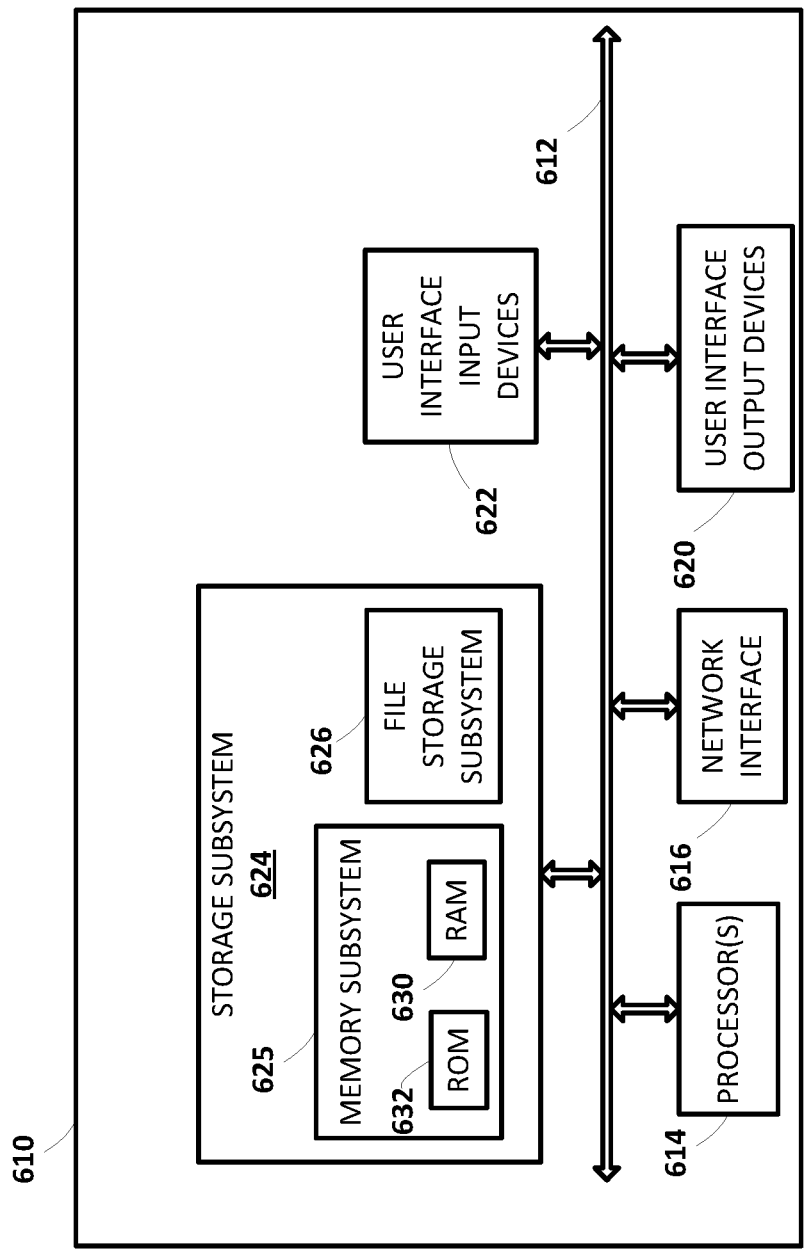
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of methods 400 and/or 500, and/or to implement one or more of cluster engine 122, template generation engine 140, interest engine 250, topic classifier 252, entity classifier 254, user profile engine 370, and/or one or more client devices 374.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
generating a plurality of electronic document templates, wherein each electronic document template is generated from a plurality of emails or text messages that share fixed content;
determining one or more user interests associated with each of the electronic document templates, wherein the one or more user interests are determined based on one or more aggregate attributes of a corpus of emails or text messages associated with the electronic document template;
storing, in one or more databases, the plurality of electronic document templates, wherein each of the electronic document templates is stored in association with one or more corresponding user interests;
identifying an email or text message addressed to a user;
selecting, from the plurality of electronic document templates, a particular electronic document template that corresponds to the email or text message addressed to the user, wherein the selecting is based on one or more attributes shared between the email or text message addressed to the user and the selected electronic document template;
detecting, based on interactions by the user with one or more computing devices, engagement by the user with the email or text message;
determining that the detected engagement satisfies a criterion, wherein satisfaction of the criterion indicates that the user is interested in the email or text message, and wherein determining that the detected engagement satisfies the criterion comprises:
determining that at least a predetermined time interval elapsed between the user first receiving the email or text message and the user scrolling down an inbox to open the email or text message, or
determining that the user had the email or text message open for at least a threshold time interval, and wherein determining that the user had the email or text message open for at least the threshold time interval indicates the user fully consumed the email or text message;
based on the determining, identifying one or more interests associated with the particular electronic document template;
storing, in one or more of the databases, one or more associations between the user and the identified one or more interests;
receiving, from a remote computing device operated by the user, a search query;
obtaining content that is responsive to the search query;
ranking the obtained content based on the identified one or more interests; and
providing, to the remote computing device, the ranked content, wherein the providing causes the ranked content to be presented as output at the remote computing device operated by the user.

2. The computer-implemented method of claim 1, wherein detecting the engagement includes determining that the user selected or otherwise operated one or more graphical elements in the email or text message.

3. The computer-implemented method of claim 1, wherein detecting the engagement includes determining that the user labeled the email or text message.

4. The computer-implemented method of claim 1, wherein the one or more interests are identified based on annotations of the particular electronic document template.

5. The computer-implemented method of claim 1, further comprising associating the one or more interests with the particular electronic document template based on a sender address associated with the particular electronic document template.

6. The computer-implemented method of claim 5, wherein the one or more interests include one or more entities mentioned in one or more web documents sharing a domain with the sender address.

7. The computer-implemented method of claim 1, further comprising associating the one or more interests with the particular electronic document template based on one or more entities mentioned in a plurality of emails or text messages used to generate the particular electronic document template.

8. A computer-implemented method comprising:
generating a plurality of electronic correspondence templates, wherein each electronic correspondence template is generated from a plurality of emails or text messages that share fixed content;
determining one or more user interests associated with each of the electronic correspondence templates, wherein the one or more user interests are determined based on one or more aggregate attributes of a corpus of emails or text messages associated with the electronic correspondence template;
storing, in one or more databases, the plurality of electronic correspondence templates, wherein each of the electronic correspondence templates is stored in association with one or more corresponding user interests;
identifying a new email or text message addressed to a user;
selecting, from the one or more databases, a particular electronic correspondence template that corresponds to the new email or text message, wherein the selecting is based on one or more attributes shared between the new email or text message addressed to the user and the selected electronic correspondence template;
detecting, based on interactions by the user with one or more computing devices, engagement by the user with the new email or text message;
determining that the detected engagement satisfies a criterion, wherein satisfaction of the criterion indicates that the user is interested in the new email or text message, and wherein determining that the detected engagement satisfies the criterion comprises determining that at least a predetermined time interval elapsed between the user first receiving the new email or text message and the user scrolling down an inbox to open the new email or text message;
based on the determining, storing, in one or more databases, one or more associations between the user and the one or more interests associated with the particular electronic correspondence template;
receiving, from a remote computing device operated by the user, a search query;
obtaining content that is responsive to the search query;
ranking the obtained content based on the identified one or more interests; and
providing, to the remote computing device, the ranked content, wherein the providing causes the ranked content to be presented as output at the remote computing device operated by the user.

9. The computer-implemented method of claim 8, wherein detecting the engagement further includes determining that the user labeled the new email or text message.

10. The computer-implemented method of claim 8, wherein detecting the engagement further includes determining that at least a predetermined time interval elapsed between the user opening and closing the new email or text message.

11. The computer-implemented method of claim 9, wherein the corpus of emails or text messages includes the plurality of emails or text messages that share fixed content.

12. The computer-implemented method of claim 11, wherein the one or more aggregate attributes are identified based on annotations of the particular electronic correspondence template.

13. The computer-implemented method of claim 11, wherein the one or more aggregate attributes include one or more mentioned entities.

14. The computer-implemented method of claim 8, wherein the corpus of emails or text messages includes one or more web documents associated with a sender of the email or text message addressed to the user.

15. The computer-implemented method of claim 14, wherein the one or more web documents are responsive to a search query that includes a sender of the email or text message addressed to the user.

16. At least one non-transitory computer-readable medium comprising instructions that, in response to execution of the instructions by one or more processors, cause the one or more processors to perform the following operations:
generating a plurality of electronic document templates, wherein each electronic document template is generated from a plurality of emails or text messages that share fixed content;
determining one or more user interests associated with each of the electronic document templates, wherein the one or more user interests are determined based on one or more aggregate attributes of a corpus of emails or text messages associated with the electronic document template;
storing, in one or more databases, the plurality of electronic document templates, wherein each of the electronic document templates is stored in association with one or more corresponding user interests;
identifying a given email or text message addressed to a user;
selecting, from the one or more databases, a particular electronic document template that corresponds to the given email or text message, wherein the selecting is based on one or more attributes shared between the given email or text message addressed to the user and the selected electronic document template;
detecting, based on interactions by the user with one or more computing devices, engagement by the user with the given email or text message;
determining that the detected engagement satisfies a criterion, wherein satisfaction of the criterion indicates that the user is interested in the given email or text message, wherein determining that the detected engagement satisfies the criterion comprises determining that the user had the given email or text message open for at least a threshold time interval, and wherein determining that the user had the given email or text message open for at least the threshold time interval indicates the user fully consumed the given email or text message;
based on the determining, identifying, in one or more of the databases, one or more interests associated with the particular electronic document template;
storing, in one or more of the databases, one or more associations between the user and the identified one or more interests;
receiving, from a remote computing device operated by the user, a search query;
obtaining content that is responsive to the search query;
ranking the obtained content based on the identified one or more interests; and
providing, to the remote computing device, the ranked content, wherein the providing causes the ranked content to be presented as output at the remote computing device operated by the user.

\* \* \* \* \*